United States Patent [19]

Albright et al.

[11] Patent Number: 5,029,918

[45] Date of Patent: Jul. 9, 1991

[54] REAR DOOR AND BUMPER FOR A SKID STEER LOADER

[75] Inventors: Larry E. Albright, Gwinner; Joseph M. Mather, Lisbon, both of N. Dak.

[73] Assignee: Clark Equipment Company, South Bend, Ind.

[21] Appl. No.: 630,431

[22] Filed: Dec. 19, 1990

Related U.S. Application Data

[63] Continuation of Ser. No. 372,686, Jun. 28, 1989, abandoned.

[51] Int. Cl.$^5$ .............................................. B60R 19/42
[52] U.S. Cl. .................................. 293/126; 293/117; 267/140; 49/460
[58] Field of Search .................... 293/102, 107–110, 293/117, 118, 120, 121, 126, 128, 142, 127; 296/50, 106, 207; 267/140; 49/460; 414/685

[56] References Cited

U.S. PATENT DOCUMENTS

| | | | |
|---|---|---|---|
| 2,188,082 | 1/1940 | Imhofe | 293/121 |
| 2,889,165 | 6/1959 | Zientara | 293/128 X |
| 2,986,419 | 5/1961 | Barenyi | 293/127 X |
| 3,669,484 | 6/1972 | Bernitz | 293/142 |
| 3,817,016 | 6/1974 | Barenyi | 293/128 X |
| 3,830,539 | 8/1974 | Yoshie et al. | 293/142 X |
| 4,055,262 | 10/1977 | Bauer et al. | 180/89.12 |
| 4,055,362 | 10/1977 | Becker | 293/121 |
| 4,350,221 | 9/1982 | Ishima | 293/142 X |
| 4,355,944 | 10/1982 | Lorenc | 414/685 |
| 4,364,591 | 12/1982 | Bien | 293/128 X |
| 4,705,449 | 11/1987 | Christianson et al. | 414/685 |

Primary Examiner—Dennis H. Pedder
Attorney, Agent, or Firm—Kinney & Lange

[57] ABSTRACT

An engine compartment at the rear of a skid steer loader is enclosed by a rear door fabricated of sheet material and having a generally horizontally extending channel formed near its lower edge. Left and right corner bumper members molded from elastomer material have recesses formed in their back sides and are fastened to the door by bolts. Each bumper member includes a rear section which fits within and extends outwardly from the channel, and a side section which extends outwardly from the side of the door.

12 Claims, 2 Drawing Sheets

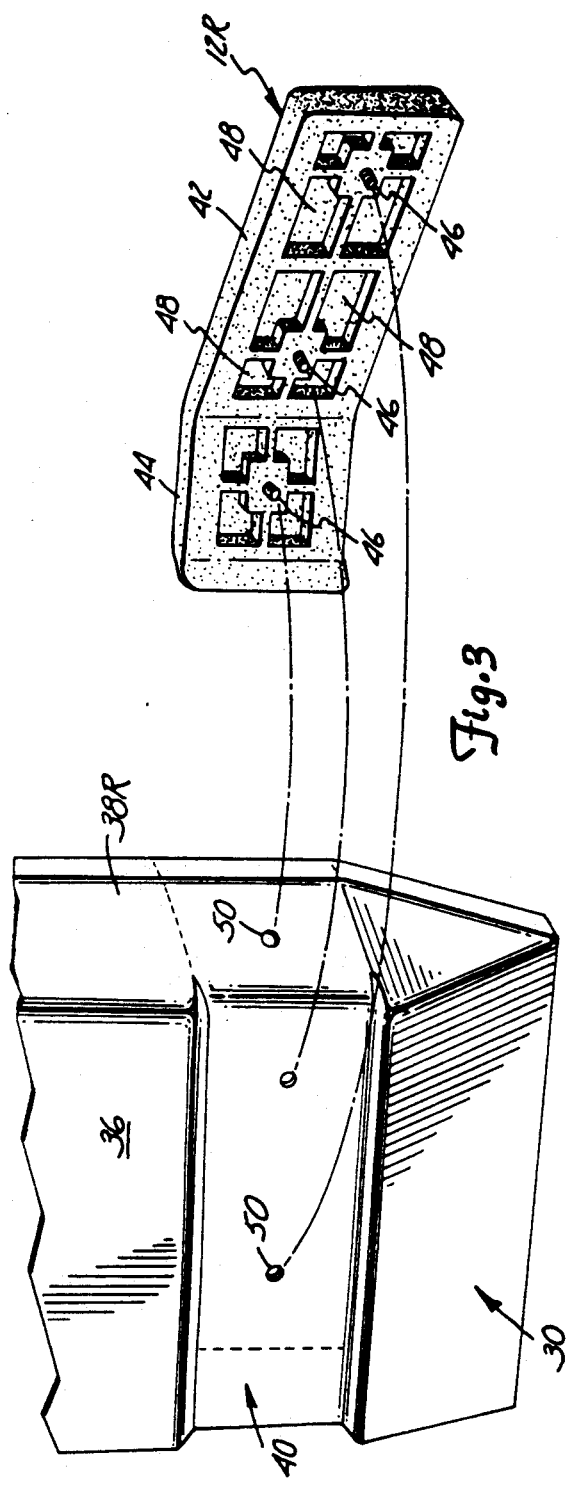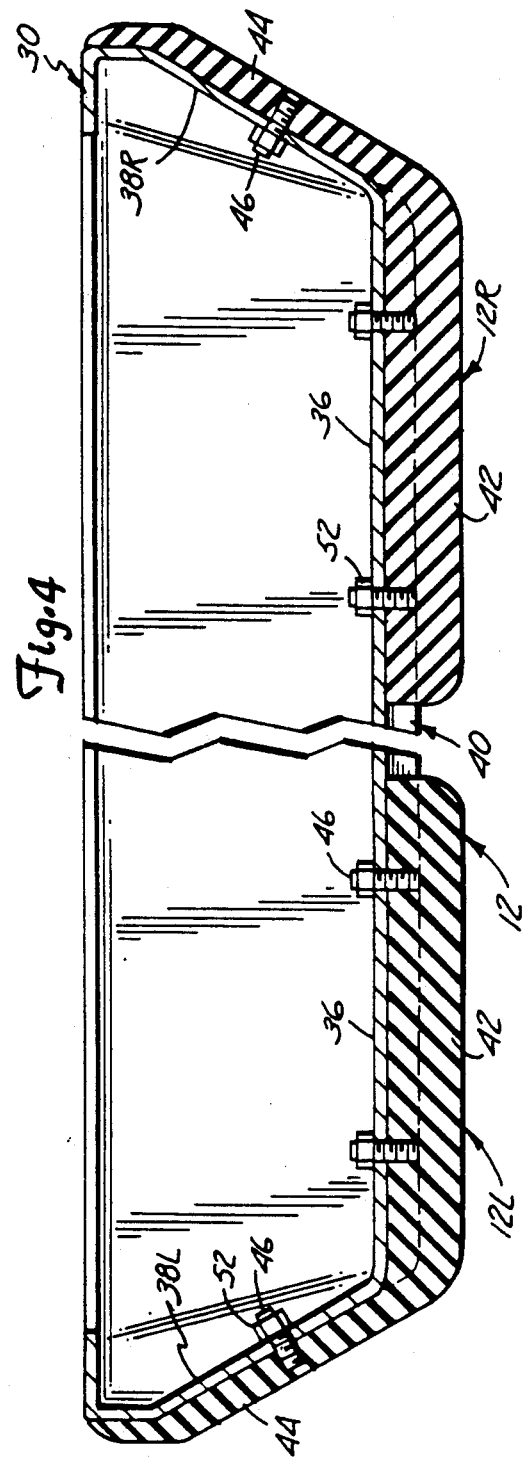

REAR DOOR AND BUMPER FOR A SKID STEER LOADER

This is a Continuation of application Ser. No. 07/372,686, filed June 28, 1989 (now abandoned).

BACKGROUND OF THE INVENTION

1. Field of the Invention.

The present invention relates generally to skid steer loaders. In particular, the present invention is a rear door and bumper for a skid steer loader.

2. Description of the Prior Art.

Skid steer loaders of the type disclosed in the Bauer et al. U.S. Pat. No. 4,055,262 are well known and in widespread use. These vehicles are very compact and are steered by driving the wheels on one side at a different speed and/or in a different direction from those on the other side. In the case where the wheels on one side are driven in a forward direction and those on the opposite side in a reverse direction, the the loader will turn on its axis, or in other words, spin on its tracks.

In view of their compact nature and highly maneuverable characteristics, skid steer loaders are often operated in environments in which they are required to negotiate around obstacles such as struts, columns, walls or other supports. Under these conditions the rear of the vehicle may at times impact with structures in the environment in which it is operated. If the forces upon impact are great enough, damage to mechanical subsystems such as the engine and hydraulic pumps which are located in the rear of the vehicle can result.

To protect the mechanical subsystems of the loader from impacts, rear portions, including the rear door, are typically made from relatively heavy gauge sheet material. These components add weight to the vehicle. Wooden strips are sometimes mounted to the rear of these vehicles after assembly to prevent paint scraping during transport. On occasion, operators have kept these wooden strips on the vehicle for protection against impacts during normal operation. They are, however, unsightly and relatively ineffective.

It is evident that there is a continuing need for skid steer loaders having an improved rear frame portion. A visually attractive rear door of high structural integrity is desired.

SUMMARY OF THE INVENTION

A skid steer loader in accordance with the present invention includes left and right laterally spaced side panel members and a rear panel member intersecting the left and right side panel members to form left and right rear corners and at latest partially defining an engine compartment at the rear of the loader. A horizontally extending channel is formed in the rear panel member. The loader is supported for over-the-ground travel by wheels, and has a pivotally mounted boom assembly. An elastomer bumper is mounted to the rear of the loader and includes right and left sections. The right section has a side portion extending outwardly from the right panel member and a rear portion extending outwardly from within the channel in the rear panel member. The left section has a side portion extending outwardly from the left panel member and a rear portion extending outwardly from within the channel in the rear panel member. Fasteners are used to secure the bumper to the loader.

In a preferred embodiment the panel members forming the left and right rear corners include a rear door having a central section and left and right side sections forming left and right rear corners of the loader. The right section of the elastomer bumper is a one-piece right corner bumper section shaped to fit around the right rear corner of the loader. The left section of the bumper is a one-piece left corner bumper section shaped to fit around the left rear corner of the loader. Rear portions of the left and right corner bumper sections have ends defining a space in the channel between the left and right corner bumper sections. A plurality of recesses are formed in the rear side of the corner bumper sections.

A skid steer loader having a rear door and bumper in accordance with the present invention has considerable advantages over those of the prior art. The channel increases the rigidity of the door and thereby adds to the structural integrity of the peripheral frame structure to protect internal components from damage due to forces generated by machine impact with other objects. The elastomer bumper members provide protection from rear and side cornering forces caused by impacts of the rear door with various objects. In addition to these advantages, the rear door and bumper members contribute to the visual appearance of the loader.

BRIEF DESCRIPTION OF THE DRAWINGS

FIG. 3 is an exploded view of the lower right hand corner of the door shown in FIG. 2, illustrating the back side of the right bumper member.

FIG. 4 is a sectional view of the rear door showing the left and right bumper members mounted in the channel.

DETAILED DESCRIPTION OF THE PREFERRED EMBODIMENTS

Figure 1:
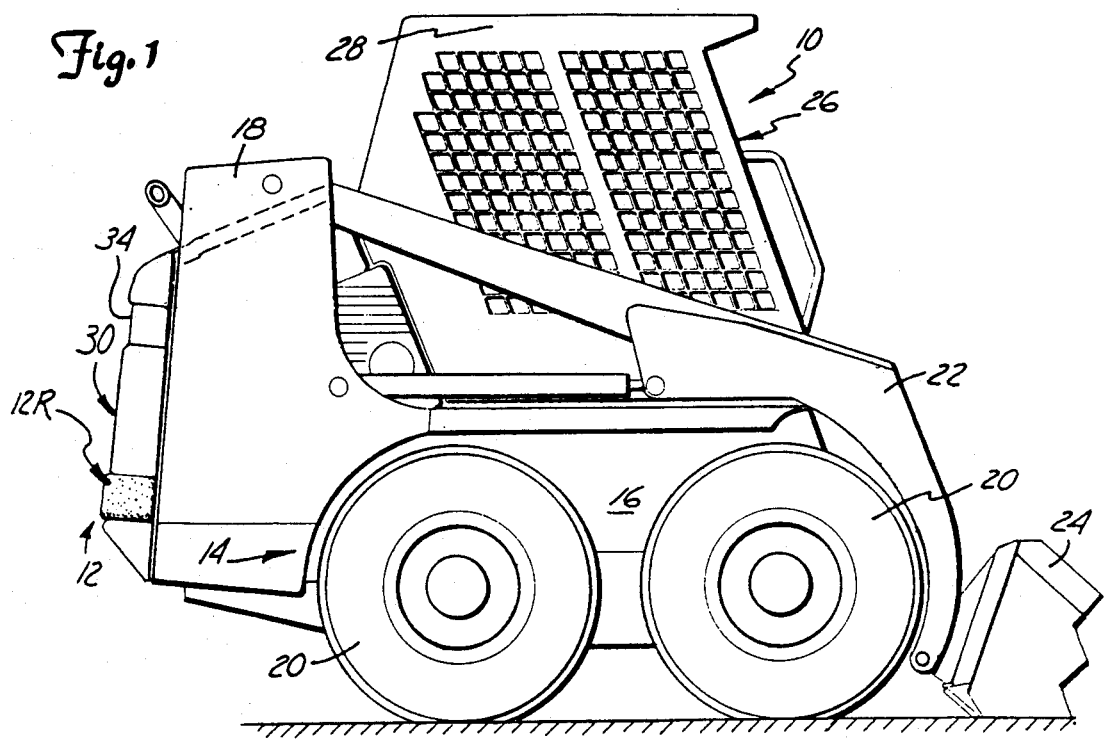
FIG. 1 is a side view of a skid steer loader which includes a rear door and elastomer bumper in accordance with the present invention.
Figure 2:
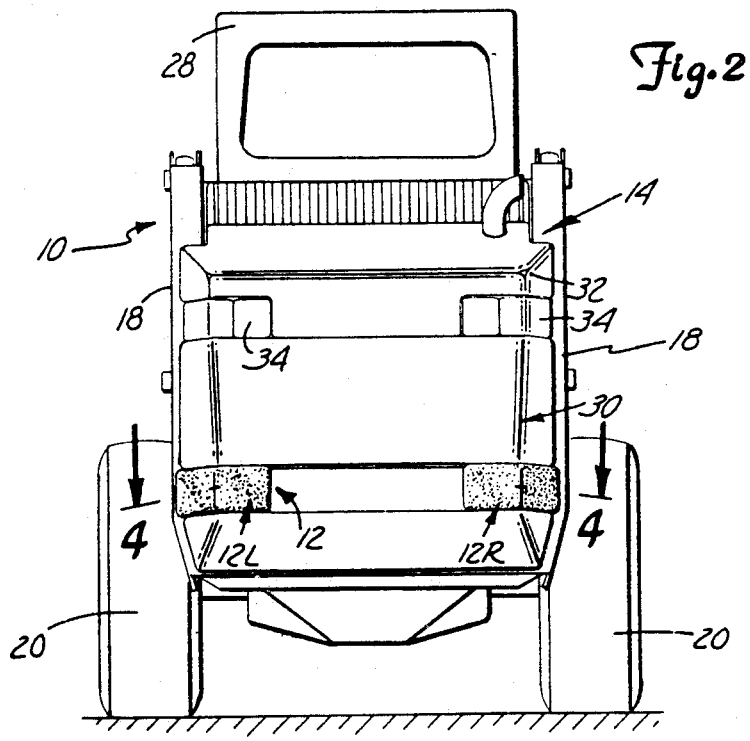
FIG. 2 is a rear view of the skid steer loader shown in FIG. 1.

A skid steer loader 10 which includes a rear door 30 and elastomer bumper means 12 in accordance with the present invention is illustrated generally in FIGS. 1 and 2. Loader 10 is constructed around a main frame 14 which is formed by left and right laterally spaced side portions or beams 16 (right side beam 16 is visible in FIG. 1) having upright members 18 at their rear. A pair of wheels 20 on each side of the vehicle support loader 10 for over-the-ground travel. Boom assembly 22 is pivotally mounted to main frame 14, and has an attachment such as bucket 24 pivotally mounted to its forward end. An operator's compartment 26 is located forward of rear door 30 between side beams 16. The general structure of skid steer loaders of the type described above is well known and disclosed, for example, in the Bauer et al. U.S. Pat. No. 4,055,262.

An engine and heat exchanger compartment is located near the rear of the vehicle behind operator's compartment 26, and has its sides at least partially defined by upright members 18. Mechanical subsystems such as the engine, hydraulic pump, radiator, radiator fan, and oil cooler are positioned within the engine compartment. A rear frame portion such as door 30 extends between upright members 18 and encloses a lower rear portion of the engine compartment. A top and upper rear portion of the engine compartment are enclosed by hood 32. Rear door 30 is hingedly mounted to one of upright members 18, and is secured to the other upright member by a latch mechanism (not shown). When unlatched, rear door 30 can be swung open in a horizontal manner, permitting access to mechanical subsystems within the engine compartment. Hood 32 is a tip-up unit hingedly mounted at its top edge to main frame 14. Hood 32 can therefore be rotated in an upwardly manner, permitting access to other subsystems such as the radiator or oil cooler. As shown, a pair of wrap-around tail lights 34 are mounted near the lower edge of hood 32, one on each of the left and right corners.

Rear door 30 and elastomer bumper 12 are perhaps best described with reference to FIGS. 3 and 4. Rear door 30 is fabricated from sheet material such as steel and includes a central section 36 and left and right side sections 38L and 38R, respectively. A recessed channel 40 extends in a generally horizontal direction across central section 36 of rear door 30, near its lower edge. In the illustrated embodiment bumper 12 is formed by left and right corner bumper members 12L and 12R, respectively. Bumper members 12L and 12R can be molded or otherwise fabricated from any of a wide variety of commercially available elastomer materials such as synthetic rubber.

Bumper members 12L and 12R are both fabricated as unitary wrap-around members shaped to correspond to the contoured rear corners of door 30. Each member includes a rear section 42 and a side section 44. Rear section 42 of bumper member 12R has a height which is less than the height of channel 40, and fits within the channel adjacent the right side or edge of central section 36 of door 30. Side section 44 of bumper member 12R fits adjacent right side section 38R of door 30. Bumper member 12L is symmetric to bumper member 12R. Rear section 42 of bumper member 12L fits within channel 40 adjacent the left edge of section 36 of door 30, while side section 44 fits adjacent left side section 38L of the door. As shown in FIGS. 2 and 4, inside edges or ends of rear sections 42 of bumper members 12L and 12R are separated from one another, leaving a space in the center of channel 40. Rear sections 42 of bumper members 12R and 12L have a width which is greater than the depth of channel 40, so that they extend outward beyond the plane formed by central section 36 of rear door 30. In the embodiment shown, side sections 44 of bumper members 12R and 12L have a width which is less than that of their corresponding rear sections 42.

To increase their ability to absorb forces of impact, bumper members 12L and 12R are fabricated with a plurality of recesses 48 in the rear side thereof. In the embodiment shown, bumper members 12L and 12R each include eight polygon shaped and geometrically arranged recesses 48 in their rear section 42, and four similarly shaped and arranged recesses in their side section 44. A plurality of threaded bolts 46 are molded within members 12L and 12R, and extend outward from the rear thereof. Bolts 46 extend through correspondingly positioned holes 50 in door 30. Nuts 52 are threaded onto bolts 46 to securely fasten bumper members 12L and 12R to the corners of door 30.

Channel 40 increases the rigidity of door 30, thereby adding to the structural integrity of the peripheral frame structure to protect internal components from damage due to forces generated by machine impact with other objects. Elastomer bumper members 12R and 12L provide protection from rear and side cornering forces caused by impacts of the rear door with various objects. Rear door 30 and bumper members 12L and 12R, along with hood 32 and tail lights 34, also contribute to the visual appearance of loader 10.

Although the present invention has been described with reference to the preferred embodiments, workers skilled in the art will recognize that changes may be made in form and detail without departing from the spirit and scope of the invention.

What is claimed is:

1. A skid steer loader including:
   left and right laterally spaced side panel members having laterally facing surfaces and a rear panel member having a rearwardly facing surface intersecting the left and right side panel members to form left and right rear corners and at least partially defining an engine compartment cover at the rear of the loader;
   a horizontally extending channel formed in the rear panel member, the channel having an inner surface recessed below the rearwardly facing surface, the channel inner surface intersecting the respective laterally facing surfaces and the channel vanishing at a corner junction with the laterally facing surfaces;
   wheels for supporting the loader for over-the-ground travel;
   a boom and bucket assembly mounted to the loader;
   an elastomer bumper mounted to the rear of the loader including:
      a right corner section having a side portion extending outwardly from the right panel member and a rear portion positioned in and having a portion extending outwardly from the channel in the rear panel member; and
      a left corner section having a side portion extending outwardly from the left panel member and a rear portion positioned in and having a portion extending outwardly from the channel in the rear panel member; and
   fasteners for securing the elastomer bumper to the loader.

2. The skid steer loader of claim 1 wherein:
   the right section of the elastomer bumper is a one-piece right corner bumper section shaped to fit around the right corner of the loader and including the right section side and rear portions; and
   the left section of the elastomer bumper is a one-piece left corner bumper section shaped to fit around the left rear corner of the loader and including the left section side and rear portions.

3. The skid steer loader of claim 2 wherein the rear portions of the left and right corner bumper sections have ends defining a space in the channel between the left and right corner bumper sections.

4. The skid steer loader of claim 1 wherein:
   the panel members forming the left and right rear corners include a rear door having a central section and left and right side sections forming left and right rear corners of the loader; and
   the left and right sections of the elastomer bumper are fastened to the rear door of the loader.

5. The skid steer loader of claim 1 wherein the fasteners include:
   first threaded fastener sections mounted in a back side of the bumper; and second threaded fastener sections cooperating with the first fastener sections to secure the bumper to the rear of the loader.

6. The skid steer loader of claim 5 wherein:

the first threaded fastener sections include bolts extending from the back side of the bumper; and the second threaded fastener sections include nuts.

7. A skid steer loader including:

a main frame having left and right laterally spaced side members at least partially defining an engine compartment at the rear of the loader;

a rear door fabricated of sheet material, including left and right side wall sections having laterally facing outer surfaces and a central rear wall section formed to the side wall sections having an outer surface and a generally horizontally extending channel recessed from the rear wall outer surface and formed to extend across the rear wall, said channel vanishing at a junction between the rear wall and each of the side wall sections, the rear door extending between the side members to at least partially define a rear of the engine compartment and being operable to permit access to the engine compartment;

wheels for supporting the loader for over-the ground travel;

a boom assembly mounted to the main frame;

a one-piece left elastomer bumper member shaped to fit around a left rear corner of the loader and including a side section positioned against the outer surface of the left side wall section and extending laterally outwardly from the left side wall section of the rear door and a rear section moldable to fit over the junction between the left side wall section and the rear wall and to be positioned within and extending outwardly from the channel; and a one-piece right elastomer bumper member shaped to fit around a right rear corner of the door and including a side section positioned against the outer surface of the right side wall section and extending outwardly from the right side section of the rear door and a rear section molded to fit over the junction between the right side wall section and the rear wall and to be positioned within and extending outwardly from the channel; and fasteners for securing the left and right elastomer bumper members to the rear door.

8. The skid steer loader of claim 7 wherein the fasteners include:

first threaded fastener sections mounted in a backside of the left and right bumper sections; and second threaded fastener sections cooperating with the first fastener sections to secure the left and right bumper members to the rear door.

9. The skid steer loader of claim 8 wherein:

the first threaded fastener sections include bolts extending from the back side of the left and right bumper members; and the second fastener sections include nuts.

10. The skid steer loader of claim 9 wherein the left and right bumper members include a plurality of recesses formed in a side thereof facing the outer surface of the rear wall and wall sections on which the bumper members are mounted.

11. The skid steer loader of claim 7 wherein the rear sections of the left and right members have ends which are spaced apart in the channel between the bumper members.

12. The skid steer loader of claim 11 wherein the side sections and rear sections of the left and right bumper shaped members are different thicknesses, to have outer surfaces that extend outwardly from the outer surfaces of the respective side wall sections and the rear wall substantially the same amount.

* * * * *

UNITED STATES PATENT AND TRADEMARK OFFICE
CERTIFICATE OF CORRECTION

PATENT NO. : 5,029,918

DATED : July 9, 1991

INVENTOR(S) : Larry E. Albright et al.

It is certified that error appears in the above-identified patent and that said Letters Patent is hereby corrected as shown below:

Col. 6, line 28, after "right", insert --bumper--.

Signed and Sealed this

Twenty-ninth Day of December, 1992

*Attest:*

DOUGLAS B. COMER

*Attesting Officer*     *Acting Commissioner of Patents and Trademarks*